(12) United States Patent
Dickson

(10) Patent No.: US 9,276,826 B1
(45) Date of Patent: Mar. 1, 2016

(54) COMBINING MULTIPLE SIGNALS TO DETERMINE GLOBAL SYSTEM STATE

(71) Applicant: GOOGLE INC., Mountain View, CA (US)

(72) Inventor: Caskey Dickson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 13/849,163

(22) Filed: Mar. 22, 2013

(51) Int. Cl.
*G06F 17/30* (2006.01)
*H04L 12/26* (2006.01)
*H04L 12/931* (2013.01)

(52) U.S. Cl.
CPC ............... *H04L 43/00* (2013.01); *H04L 49/00* (2013.01)

(58) Field of Classification Search
USPC ......................................... 709/217, 224, 223
See application file for complete search history.

(56) References Cited

U.S. PATENT DOCUMENTS

| | | | |
|---|---|---|---|
| 6,681,232 B1* | 1/2004 | Sistanizadeh et al. | |
| 7,233,877 B2 | 6/2007 | King et al. | |
| 8,204,717 B2 | 6/2012 | McLaughlin et al. | |
| 8,843,386 B2* | 9/2014 | Greene et al. | 705/7.11 |
| 8,843,618 B2* | 9/2014 | Li | 709/224 |
| 2002/0005781 A1* | 1/2002 | Britton | 340/540 |
| 2003/0005024 A1* | 1/2003 | Grumann | 709/102 |
| 2005/0010428 A1* | 1/2005 | Bergeron | G06F 17/2785 705/2 |
| 2005/0033605 A1* | 2/2005 | Bergeron | G06F 17/27 705/2 |
| 2005/0065753 A1 | 3/2005 | Bigus et al. | |
| 2005/0080888 A1* | 4/2005 | Walter | 709/223 |
| 2006/0173672 A1* | 8/2006 | Bergeron | G06F 17/27 704/9 |
| 2010/0156632 A1 | 6/2010 | Hyland et al. | |
| 2010/0305806 A1* | 12/2010 | Hawley | 701/33 |
| 2011/0006906 A1 | 1/2011 | Pearson | |
| 2011/0010130 A1 | 1/2011 | Hadden et al. | |
| 2012/0130781 A1* | 5/2012 | Li | G06Q 30/0241 705/14.4 |

* cited by examiner

*Primary Examiner* — Jude Jean Gilles
(74) *Attorney, Agent, or Firm* — Lerner, David, Littenberg, Krumholz & Mentlik, LLP

(57) ABSTRACT

Methods and systems are provided for monitoring the health of a service by using a comprehensive collection of analytical values derived from data obtained from a plurality of sensors. Many simultaneous data points are gathered by sensors monitoring a service, which then send the raw data to a collection of analyzers (e.g., servers) running in one or more centralized data centers for examination. Collected data is analyzed to generate various metrics (e.g., analytical values) that can be combined with other data and analysis results to provide indications about the overall health of the service.

25 Claims, 7 Drawing Sheets

COMBINING MULTIPLE SIGNALS TO DETERMINE GLOBAL SYSTEM STATE

TECHNICAL FIELD

The present disclosure generally relates to systems and methods for monitoring the health of a system or service. More specifically, aspects of the present disclosure relate to determining the state of a system or service by using a comprehensive collection of analytical values derived from data obtained from a plurality of sensors.

BACKGROUND

When performing system health monitoring or other similar operations or processes that attempt to achieve a comprehensive status or "big-picture" of large-scale systems, it is often difficult to move from a collection of measurements to a useful view of the system as a whole. One conventional approach to obtaining measurements for large systems is through what is sometimes referred to as "black-box monitoring" ("BBM"). When utilizing BBM, no knowledge of the internal state of the overall system is used to help measure availability of various components of the system. Instead the system is used as a customer (hereinafter referred to as a "user") would use it, and the response evaluated to generate a signal.

An example of this conventional approach for monitoring large-scale systems is shown in FIG. 1, and includes the use of many distributed sensors that perform individual tests and produce a binary value (e.g., up/down, good/bad, OK/Not-OK, etc.) as output. Testing output such as this can be very noisy in complex systems where an individual component failing does not necessarily mean that the service is actually down. The output generated by these many sensors is aggregated and then rules designed to examine the percentage of successes-to-failures are used to compare against one or more thresholds.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a monitoring system comprising one or more processing devices, and one or more storage devices storing instructions that, when executed by the one or more processing devices, cause the one or more processing devices to perform: receiving sensor data obtained for a network service from a plurality of sensors at one or more locations of the network services; combining the sensor data for the network service received from the plurality of sensors; analyzing the combined sensor data for the network service; generating one or more metrics for evaluating performance of the network service, the one or more metrics being based on the analyzed combined sensor data; and storing the one or more metrics in a data repository.

According to another embodiment, the one or more processing devices are further caused to perform retrieving, from at least one database, historical sensor data for the network service.

According to another embodiment, the one or more processing devices are further caused to perform combining the sensor data for the network service received from the plurality of sensors with the historical sensor data for the network service retrieved from the at least one database, and analyzing the combined sensor data and historical sensor data to generate one or more metrics for evaluating performance of the network service.

According to yet another embodiment, the one or more processing devices are further caused to perform retrieving, from at least one database, administrative data for the network service, the administrative data indicating an expected status of the network service.

According to still another embodiment, the one or more processing devices are further caused to perform combining the sensor data for the network service received from the plurality of sensors with the administrative data for the network service retrieved from the at least one database, and analyzing the combined sensor data and administrative data to generate one or more metrics for evaluating performance of the network service.

According to another embodiment, the monitoring system further comprises one or both of an administrative database configured to store data about an operational status of the network service, and a health history database configured to store data about historical observations for the network service.

According to yet another embodiment, the monitoring system further comprises an alerting component configured to generate an alert signal based on the one or more metrics for evaluating performance of the network service.

According to another embodiment, the one or more processing devices are further caused to perform sending a notification of the one or more metrics being stored in the data repository to the alerting component.

Another embodiment of the present disclosure relates to a computer-implemented method for monitoring a network service, the method comprising: receiving sensor data obtained for the network service from a plurality of sensors at one or more locations of the network service; combining the sensor data for the network service received from the plurality of sensors; analyzing the combined sensor data for the network service; generating one or more metrics for evaluating performance of the network service, the one or more metrics being based on the analyzed combined sensor data; and storing the one or more metrics in a data repository.

According to another embodiment, the method for monitoring a network service further comprises: obtaining, from a database, historical sensor data stored for the network service; combining the sensor data received from each of the sensors with the historical sensor data obtained from the database; and generating one or more metrics for evaluating performance of the network service based on the combined sensor data and historical sensor data.

According to another embodiment, the method for monitoring a network service further comprises: obtaining, from a database, administrative data for the network service, the administrative data indicating an expected status of the network service; combining the sensor data received from each of the sensors with the administrative data obtained from the database; and generating one or more metrics for evaluating performance of the network service based on the combined sensor data and administrative data.

According to yet another embodiment, the method for monitoring a network service further comprises: obtaining, from one or more databases, historical sensor data and administrative data stored for the network service, the historical sensor data including historical observations for the network service and the administrative data indicating an expected status of the network service; generating one or more metrics for evaluating performance of the network service based on the sensor data received from the sensors, the historical sensor data, and the administrative data; and storing the computed one or more metrics, the sensor data, the historical sensor data, and the administrative data in a data repository.

Still another embodiment of the present disclosure relates to a computer-implemented method comprising: receiving, at a server, a service health request for a network service; determining that the service health request is valid; collecting sensor data for the network service; storing the service health request and the collected sensor data in a data repository; and generating a notification indicating that the service health request and the collected sensor data for the network service are stored in the data repository.

According to another embodiment, the operation of determining that the service health request is valid includes determining that the request is consistent with the network service, and determining that resources are available to fulfill the request.

According to another embodiment, the operation of collecting sensor data for the network service includes sending a data collection request to sensors at one or more locations of the network service, and receiving, in response to the data collection request, sensor data from each of the sensors.

Yet another embodiment of the present disclosure relates to a computer-implemented method comprising: receiving, at a server, a notification that a service health request has been made for a network service; retrieving, from a data repository, the service health request and data collected for the network service; determining, based on the service health request, one or more analyses to be performed; performing the one or more analyses using the data collected for the network service to compute one or more metrics for evaluating performance of the network service; and storing the one or more computed metrics with the service health request in the data repository.

According to one or more other embodiments, the methods and systems described herein may optionally include one or more of the following additional features: the sensor data includes processed and/or unprocessed sensor data for the network service; the one or more metrics include one or more of operating efficiency of the network service, overloaded components of the network service, and failing components of the network service; the service health request is a request for the network service to be monitored; the service health request is a request to verify a connection with the network service; and/or the data collected for the network service includes one or more of sensor data obtained by sensors at one or more locations of the network service, data about historical observations made for the network service, and administrative data for the network service, the administrative data indicating an expected status of the network service.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
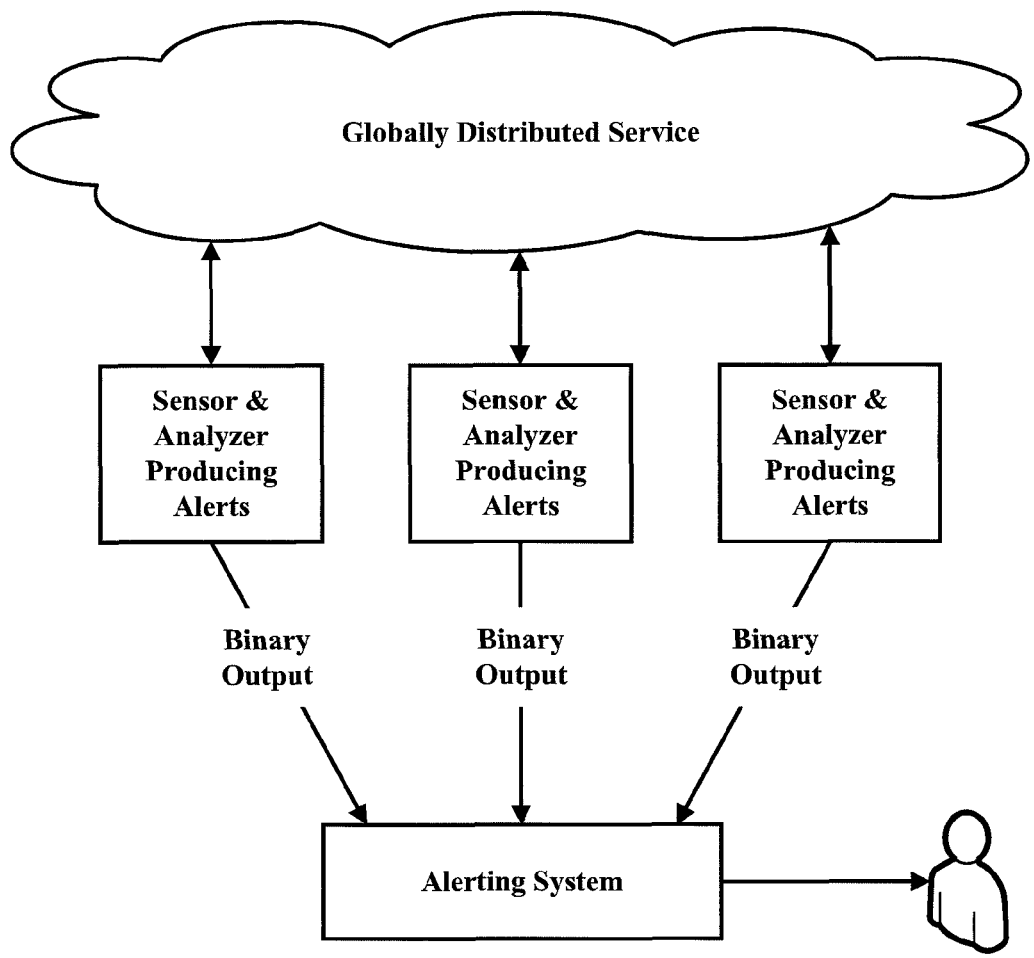
FIG. 1 is a block diagram illustrating a conventional arrangement for monitoring the health of a service.

The headings provided herein are for convenience only and do not necessarily affect the scope or meaning of the claims.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various embodiments and examples will now be described. The following description provides specific details for a thorough understanding and enabling description of these examples. One skilled in the relevant art will understand, however, that the embodiments described herein may be practiced without many of these details. Likewise, one skilled in the relevant art will also understand that the embodiments described herein can include many other obvious features not described in detail herein. Additionally, some well-known structures or functions may not be shown or described in detail below, so as to avoid unnecessarily obscuring the relevant description.

Embodiments of the present disclosure relate to methods and systems for monitoring the health of a service by using a comprehensive collection of analytical values derived from data obtained from a plurality of sensors. As will be described in greater detail herein, when a network service, host resource, infrastructure component, or the like is being evaluated, many simultaneous data points are gathered by sensors and sent to a collection of analyzers (e.g., servers) running in a centralized data center for examination.

In describing various embodiments of the present disclosure, data points (or simply "data") collected by sensors are sometimes referred as "payloads". Additionally, in at least some embodiments, the collection of analyzers, databases and/or data repositories, as well as various other components that will be described in greater detail below, may be collectively referred to as a "health monitoring system." Furthermore, some embodiments of the present disclosure may also include a plurality of distributed sensors (e.g., sensing devices, data capture devices, data measurement devices, etc.) and/or one or more alerting and notification systems. In such embodiments, reference may sometimes be made to a "distributed health monitoring system," a "health monitoring and alert system," and various other labels or terms containing similar such language. It should also be understood that, in accordance with one or more embodiments of the present disclosure, the monitoring methods and systems presented herein are implemented as software (e.g., a software application).

As will be described in greater detail herein, sensors collect raw data from a service (e.g., a globally-distributed service) and send the data to a centrally-located health monitoring system, where the data is analyzed to generate various metrics (e.g., analytical values) that can be combined with other data and analysis results to provide indications about the health or state (e.g., operating efficiencies, overloaded components, failing components, etc.) of the service. For example, in at least one embodiment the health monitoring system of the present disclosure provides a comprehensive collection of analytical values describing the health of the service, which are then sent to a monitoring and alerting system for historical analysis and notification of service administrators when appropriate. It should be noted that although many embodiments and examples are described in the context of a "service," the methods and systems presented herein are designed for monitoring any of a variety of infrastructure components and processes including, for example, applications, services, operating systems, network protocols, etc.

Conventional monitoring approaches, such as the exemplary system shown in FIG. 1, include sensors making decisions concerning the health of the service they are interacting with, producing as output a binary value (e.g., up/down, good/bad, OK/Not-OK, etc.) based on incomplete information. In the various embodiments of the present disclosure, sensors gather only raw data (e.g., payload) that is sent to a centralized health monitoring center (e.g., server or collection of servers) where the raw data may be aggregated with other payloads to obtain a more robust and comprehensive decision about the state of the service or system.

A common alternative approach involves running many monitoring systems spread throughout a network and then aggregating each system's individual decisions to produce a "meta-status." This alternative tends to be of the threshold variety where the number of succeeding probes (e.g., sensors) is compared against the number of failing probes. As a result, a tremendous amount of work goes into "tuning" these thresholds to balance the false positives with the chance of missing an outage or failure. A key difference between this alternative and the approach described in the various embodiments of the present disclosure (which is sometimes referred to herein as "B4M" for notational simplicity) is that the B4M approach allows decisions to be made using a multitude of raw data instead of merely thresholding a number of "yes/no" answers.

Another alternative, which moves away from the central analysis approach, is to have the sensors directly share their state information with each other instead of going through a central server or processor. Under this alternative, the sensors are essentially performing their own independent analysis function when making local decisions. Such sensors would need be significantly more complex than sensors used in conjunction with a central server. Therefore, when this approach is considered in the context of a large number of sensors (e.g., thousands or hundreds-of-thousands), the cost (e.g., both in terms of equipment, maintenance complexity, data transfer, etc.) of implementing and maintaining such a system would be enormous.

Yet another possible alternative is to have historical data and meta-information pushed-out from a central server or location to each of the sensors so that each sensor can incorporate past state into its present decision-making. This approach not only has potential problems similar to those described above, but also includes latency and communication delays.

Utilizing an alerting system (e.g., the ultimate consumer of the signals produced by the health monitoring system of the present disclosure) to aggregate partial signals addresses many of the aforementioned problems. However, alternative approaches are never able to completely tune the applicable system(s) as work load changes, software/hardware updates, and environmental effects can disturb what is considered a "working/healthy" service in the aggregate.

Figure 2:
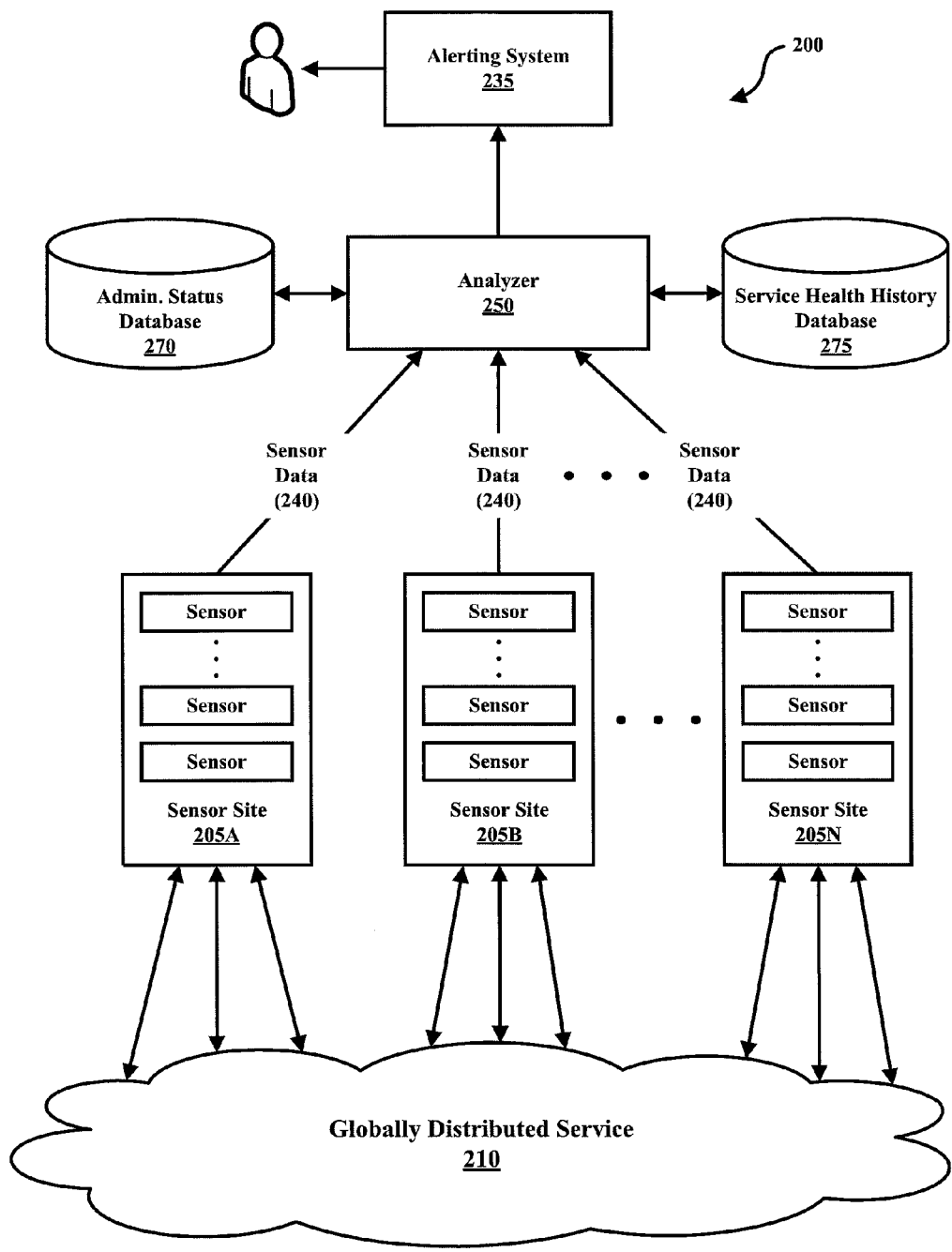
FIG. 2 is a block diagram illustrating an example monitoring system and surrounding environment in which one or more embodiments described herein may be implemented.
Figure 3:
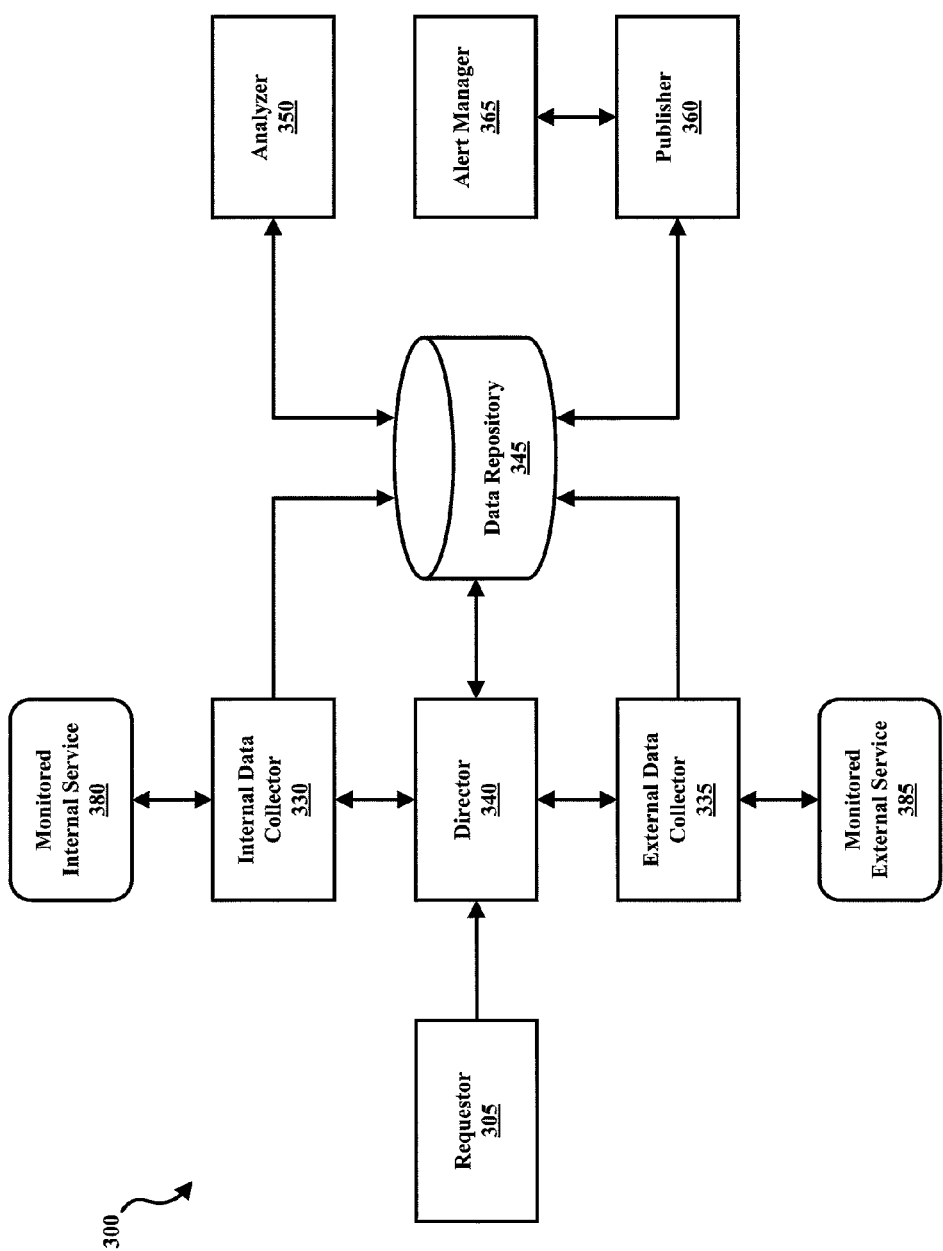
FIG. 3 is a block diagram illustrating an example data repository system for service health monitoring according to one or more embodiments described herein.

FIGS. 2 and 3 illustrate example service health monitoring systems, including data repositories in slightly different forms according to one or more embodiments described herein. As will be described in greater detail below, some or all parts of either of the data repositories shown in FIGS. 2 and 3 may be a permanent database or a transitory collection of recent results held in memory.

Referring to FIG. 2, the example monitoring system 200 includes a plurality of sensor sites 205a, 205b, up through 205n (where "n" is an arbitrary number), an analyzer 250 (e.g., a server), a service health history database 275, and an administrative status database 270. Each of the plurality of sensor sites 205a, 205b, up through 205n may be in communication with a globally distributed service 210. Additionally, each of the sensor sites 205a, 205b, up through 205n may be configured to send processed and/or unprocessed sensor data 240 to the analyzer 250. In at least one embodiment, the monitoring system 200 may also include an alerting system or component 235, which may be configured to generate an alert signal based on the monitored status of a particular service as determined, for example, by the analyzer 250.

The multiple communication lines from sensor sites 205a, 205b, up through 205n to the globally distributed service 210 represent that, in at least one embodiment, the same part of the globally distributed service 210 may be monitored from more than one of the sensor sites 205a, 205b, up through 205n at any given time.

The administrative status database 270 may be configured to store data and information about whether a particular system/service is supposed to be fully functional and in operation, or is offline for maintenance, repair, etc. For example, the administrative status database 270 may provide an expected status (e.g., operational or functional status) of the service. For example, information retrieved from or provided by the administrative status database 270 may be utilized (e.g., by the analyzer 250) to prevent unnecessary remedial action in situations such as a sensor indicating something is not working properly when the cause is that the function has been turned off intentionally.

The service health history database 275 may be configured to store historical data and information about results of sensor readings obtained, for example, from the sensor sites 205a, 205b, up through 205n. In at least one embodiment, the service health history database 275 may be used to detect long-term trends that may not be apparent from examining the most recent data obtained by the system 200. For example, in addition to alerting when the temperature at a sensor site has increased beyond a certain threshold (e.g., 90-degrees), it is also useful to alert if the temperature at the sensor site is outside of the historical norms for that time of the day, that day of the week, that week of the year, and so on.

Accordingly, in one or more embodiments, the administrative status database 270 and the service health history database 275 represent historical observations as well as administratively defined expectations.

Referring now to FIG. 3, illustrated is an example data repository system that may be configured for service health monitoring according to one or more embodiments of the present disclosure.

In at least one embodiment, the data repository system 300 may include a requestor 305, an internal data collector 330, a director 340, an external data collector 335, a data repository 345, an analyzer 350, a publisher 360, and an alert manager 365. Additionally, monitored internal service 380 and monitored external service 385 represent one or more aspects of a globally distributed service (e.g., globally distributed service 210 as shown in the example system of FIG. 2) being monitored or observed by the system. For example, the monitored external service 385 may correspond to one or more specific parts of a globally distributed service when viewed from outside the directly-managed environment.

The requestor 305 may be a mechanism configured to input requests (e.g., probes) that something be monitored (e.g., by the service health monitoring system 200 as shown in FIG. 2). For example, the requestor 305 may input requests that a particular part or function of a service be monitored to determine whether any problems exist. Such a request may be for a one-time monitoring event or may be a request for a particular service to be continually monitored until some future change or event occurs.

The director 340 may be configured to arbitrate requests input by the requestor 305, and allocate such requests to the available sensor network for data collection. For example, the director 340 may assign requests to one or more sensor sites (e.g., sensor sites 205a, 205b, up through 205n as shown in the example system of FIG. 2), which may include internal data collector 330 and/or external data collector 335. Some of those sensors may be "internal" to the system (e.g., organic to the system) while others may be "external" to the system (e.g., existing outside of the directly managed infrastructure). In at least one embodiment, the internal data collector 330 and the external data collector 335 may be similar and represent the collection of sensors grouped according to whether they are internal or external.

The data repository 345 may be configured for comprehensive data storage and maintenance of data from one or more databases in the monitoring system, as well as sensor results. For example, the data repository 345 may store the sum total of data from a service health history database, an administrative status database, and various sensor results (e.g., service health history database 275, administrative status database 270, and sensor results 240, as shown in the example system of FIG. 2). In accordance with at least one embodiment, the data repository 345 may be configured as multiple overlapping components that exist both internally to the other components of the system 300 (e.g., internally to the internal data collector 330, the director 340, the external data collector 335, the analyzer 350, the publisher 360, and the alert manager 365), as well as some kind of external form.

Further, the analyzer 350 may be configured to examine current sensor data, past sensor data, and administrative expectations (e.g., sensor data 240, data from the health history database 275, and data from the administrative status database 270, respectively, as shown in the example system of FIG. 2), and synthesize information derived from both internal and external views of the global service (e.g., internal monitored service 380 and external monitored service 385 of global service 210, as illustrated in FIGS. 2 and 3) in order to generate a comprehensive system view, which is not likely to have been realized independently at either the internal data collector 330 or the external data collector 335.

The publisher 360 may be configured to take the results of analysis and promulgate them in one or more ways. For example, the publisher 360 may be an interface that allows for administrative review of service health. Additionally, the publisher 360 may also be configured as an interface for the alert manager 365 to transmit one or more alarms via traditional escalation paths (e.g., pagers, cellular phones, e-mails, sirens, lights, etc.).

It should be noted that in one or more other embodiments of the present disclosure, one or more other components, modules, units, etc., may be included as part of the data repository system 300, in addition to or instead of those illustrated in FIG. 3. Depending on the particular implementation, one or more of the components of the data repository system illustrated in FIG. 3 may be part of a separate system or may be a subcomponent within one or more of the other components illustrated. Furthermore, the names used to identify the units and components included as part of the data repository system 300 (e.g., "requestor," "director," etc.) are exemplary in nature, and are not in any way intended to limit the scope of the disclosure.

Figure 4:
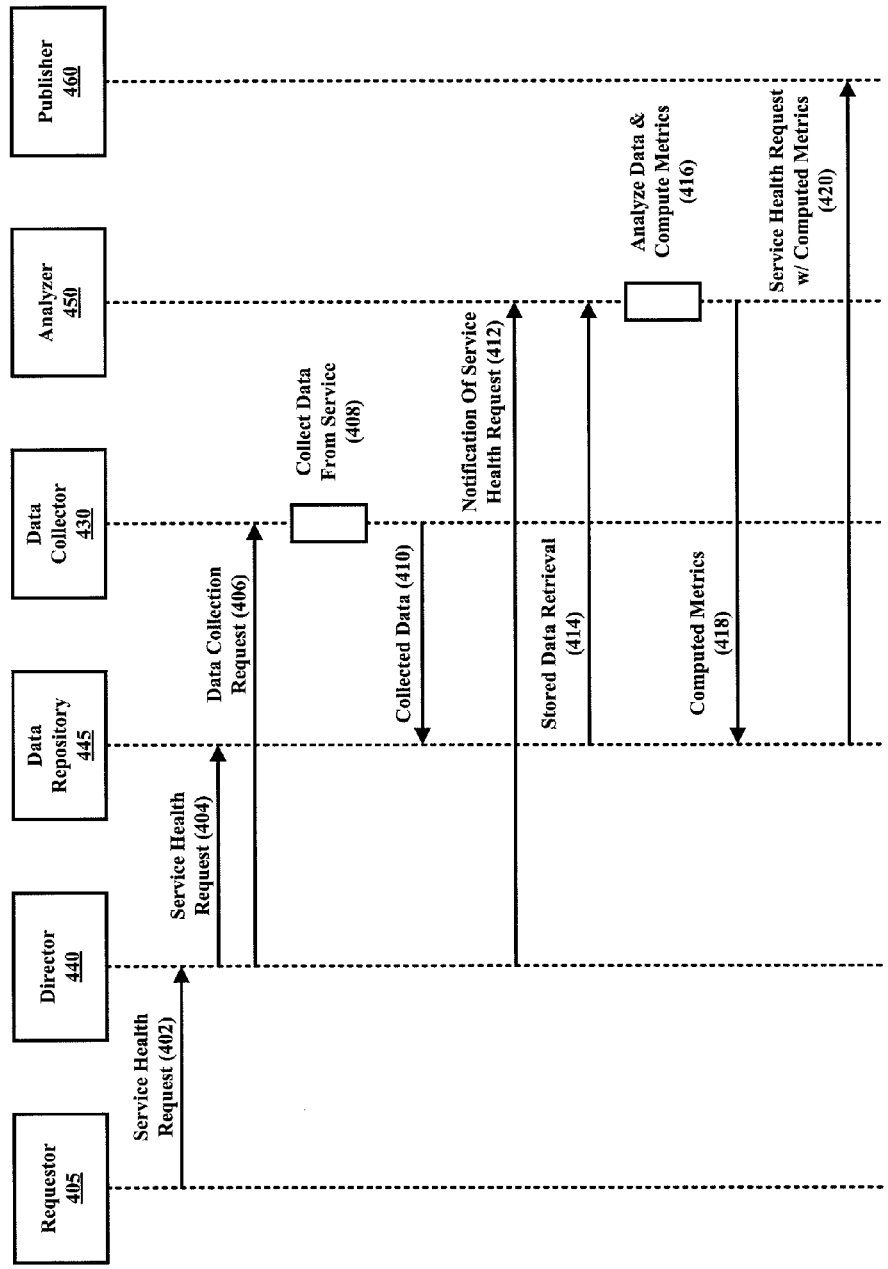
FIG. 4 is a data flow diagram illustrating example communications for monitoring the health of a service according to one or more embodiments described herein.

FIG. 4 illustrates example communications and data flows for monitoring the health of a service according to one or more embodiments described herein. The example data flows are shown between a requestor 405, director 440, data repository 445, data collector 430, analyzer 450, and publisher 460. In accordance with at least one embodiment, one or more of the components shown in FIG. 4 may be similar to corresponding components shown in the example system of FIG. 3. Accordingly, in the following description of FIG. 4 reference may be made to one or more of such components included in the example system shown in FIG. 3 and described in detail above.

A service health request (402) may be input from the requestor 405 to the director 440. The service health request (402) may be, for example, a request that a component or function of a service (e.g., monitored internal service 380 or monitored external service 385 as shown in the example system of FIG. 3) be monitored. For example, the service health request (402) may be a request that a service be monitored to determine whether one or more problems exist. In some scenarios, the service health request (402) may be a request for a one-time monitoring event while in other scenarios the service health request (402) may be a request for continuous monitoring until some future change or event occurs.

The director 440 may forward the service health request (404) to the data repository 445. The director 440 may also send one or more data collection requests (406) to a data collector 430 (e.g., internal data collector 330 and/or external data collector 335 as shown in the example system of FIG. 3). According to at least one embodiment, the director 440 may be configured to arbitrate the service health requests (402) input by the requestor 405, and allocate such requests to the available sensor network for data collection. For example, the director 440 may assign data collection requests (406) to one or more sensor sites (e.g., sensor sites 205a, 205b, up through 205n as shown in the example system of FIG. 2, which may include the internal data collector 330 and/or the external data collector 335 of FIG. 3).

The data collector 430 may collect data (408) from the component or function of the service being monitored. For example, the data collector 430 may collect raw data from a globally-distributed service (e.g., globally-distributed service 210 as shown in FIG. 2) and send the collected data (410)

to the data repository 445 for storage. In at least one embodiment, the collected data (410) may be stored in the data repository 445 along with a mapping to the associated service health request (404) stored in the data repository 445 by the director 440, so as to allow for easy retrieval of both the request and collected data.

The director 440 may also generate and send a notification of service health request (412) to the analyzer 450. In at least one embodiment, the notification (412) sent from the director 440 to the analyzer 450 may include a notification that a service health request has been received and also that data has been collected for the request by one or more data collectors (e.g., one or both of the internal data collector 330 and the external data collector 335) for a particular component or function of a service being monitored (e.g., monitored internal service 380 or monitored external service 385). For example, the director 440 may send to the analyzer 450 a notification (412) that a service health request has been input by a requestor 405, and therefore the analyzer 450 should retrieve collected data associated with the request from the data depository 445.

In one embodiment, the analyzer 450 may retrieve, from the data repository 445, the service health request and the collected data (414) for the service health request, while in another embodiment the system may be configured such that the director 440 may send the service health request and collected data for the request to the analyzer 450. In either such embodiment, the analyzer 450 may analyze the data and compute relevant metrics (416) accordingly. For example, the analyzer 450 may compute one or more globally-analyzed metrics for evaluating the health of the subject service. Examples of such metrics include rate-of-change in the 99th percentile latency, throughput in queries per second, service-induced latency (delay) after factoring-out currently-known latencies of dependent systems, and the like.

The analyzer 450 may store the computed metrics (418) from the analysis in the data repository 445. Depending on the implementation, the analyzer 450 may store the computed metrics (418) together with the associated service health request, or may simply forward the computed metrics (418) to the data repository 445 to be mapped to the corresponding request in some other manner.

The service health request and corresponding computed metrics (420) stored in the data repository 445 may be retrieved by the publisher 460. In accordance with at least one embodiment, the director 440, data repository 445, or some other component of the system may be configured to periodically send service health requests and computed metrics (420) to the publisher 460 according to some predetermined interval of time (e.g., every 5 minutes, every hour, etc.). As described above, the publisher 460 may be configured to take the results of the analysis (performed by the analyzer 450) and promulgate the results in one or more ways (e.g., the publisher 460 may be an interface that allows for administrative review of service health and may further be configured to transmit one or more alarms to an alert manager (e.g., alert manager 365) via one or more escalation paths (e.g., pagers, cellular phones, e-mails, sirens, lights, etc.)).

Figure 5:
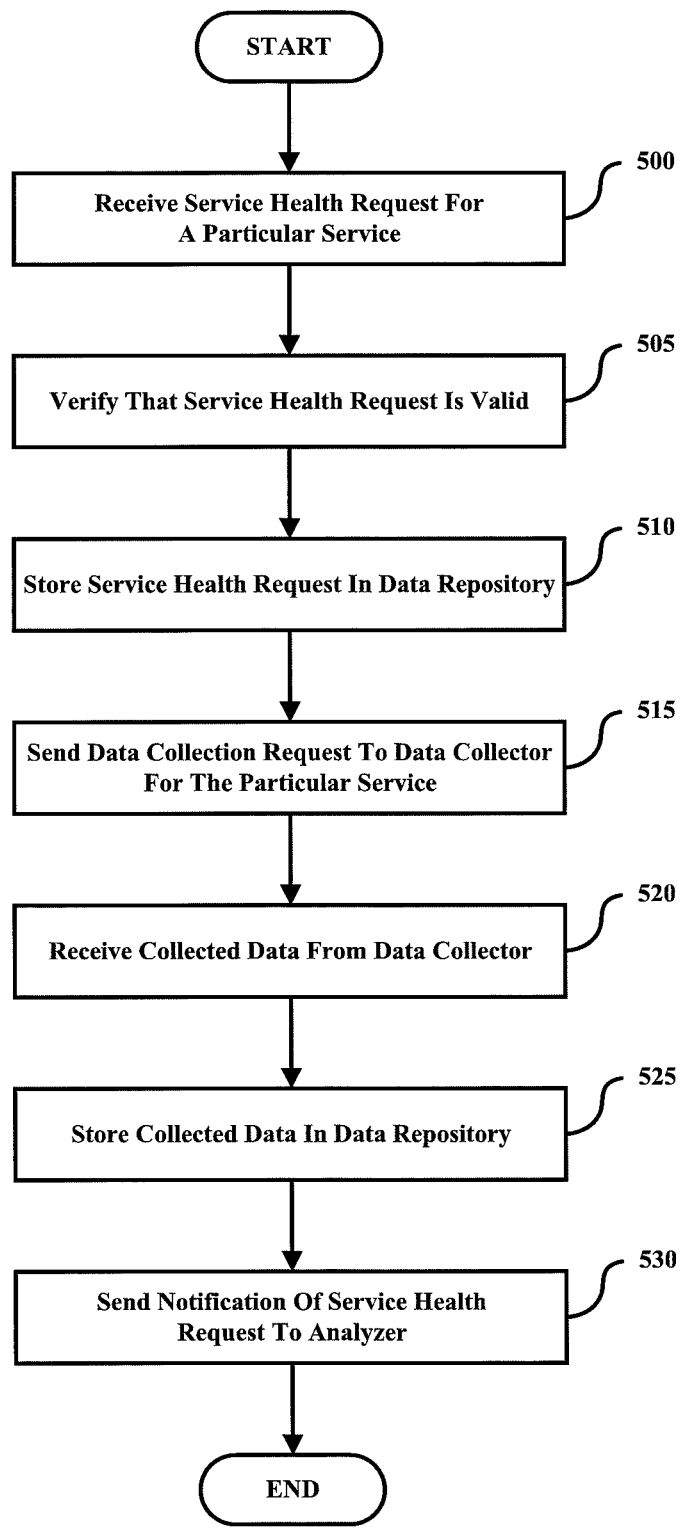
FIG. 5 is a flowchart illustrating an example process for receiving a service health request and monitoring a service to collect data for analysis according to one or more embodiments described herein.

FIG. 5 illustrates an example process for receiving a service health request and monitoring a service to collect data for analysis according to one or more embodiments described herein. In the following description of FIG. 5, reference may be made to one or more of the components included in the example system shown in FIG. 3 and described in detail above.

The process may begin at block 500 where a service health request may be received for a particular service, or a component and/or function of a service. For example, with reference to the example system shown in FIG. 3, the service health request may be received at the director 340 from the requestor 305, and the service health request may be a request that a particular service be monitored (e.g., by the service health monitoring system 200 as shown in FIG. 2) to determine whether one or more problems exist.

At block 505, the service health request received at block 500 may be verified to determine that the request is valid (e.g., determine that the request can be fulfilled). In accordance with at least one embodiment, determining that the request is valid at block 505 may include determining that the request is structurally valid, administratively valid, or both. Structural validity may be determined based on whether the request is internally complete, consistent, sensible, etc. For example, a request that an e-mail server serve-up a web page may be deemed not a structurally valid request. Administrative validity may be determined based on whether the request disrupts, burdens, or otherwise interferes with the administration of the monitored service. For example, not every user of a system can necessarily request that the system check every possible connected system. Similarly, even for allowed/acceptable checks, there are limits on how frequently such checks may be made. Otherwise, the monitoring function itself may place an unacceptable level of load on the monitored service.

Once the service health request has been identified as a valid request, the service health request may be stored in a data repository (e.g., data repository 345 as shown in the example system of FIG. 3). For example, with reference to FIG. 3, the director 340 may forward the service health request received from the requestor 305 to the data repository 345 for later retrieval or other use.

Referring again to FIG. 5, the process may move from block 510 to block 515, where a data collection request may be sent to a data collector for the particular service that has been requested for monitoring. For example, in at least one embodiment, a data collection request may be sent from the director 340 to one or both of the internal data collector 330 and the external data collector 335, which may collect data from the internal/external service being monitored 380 or 385.

At block 520, in response to the data collection request sent at block 515, data on the monitored service may be received from the data collector (e.g., one or both of the internal data collector 330 and the external data collector 335). In one example implementation, the data may be received from the data collector by the director 340, which may filter and/or analyze the data before forwarding the data to the data repository at block 525. In another implementation, the data may be received by another component of the system (or received by the data repository itself) before being stored in the data repository at block 525.

The process may continue from block 525 to block 530, where a notification of a service health request may be sent to an analyzer (e.g., analyzer 350 as shown in the example system of FIG. 3). As described above, in accordance with at least on embodiment, the analyzer may be configured to examine the data (e.g., current sensor data, past sensor data, and/or administrative expectations) collected by the data collector and stored in the data repository at block 525, and synthesize information in order to generate a comprehensive system view of the service being monitored.

Figure 6:
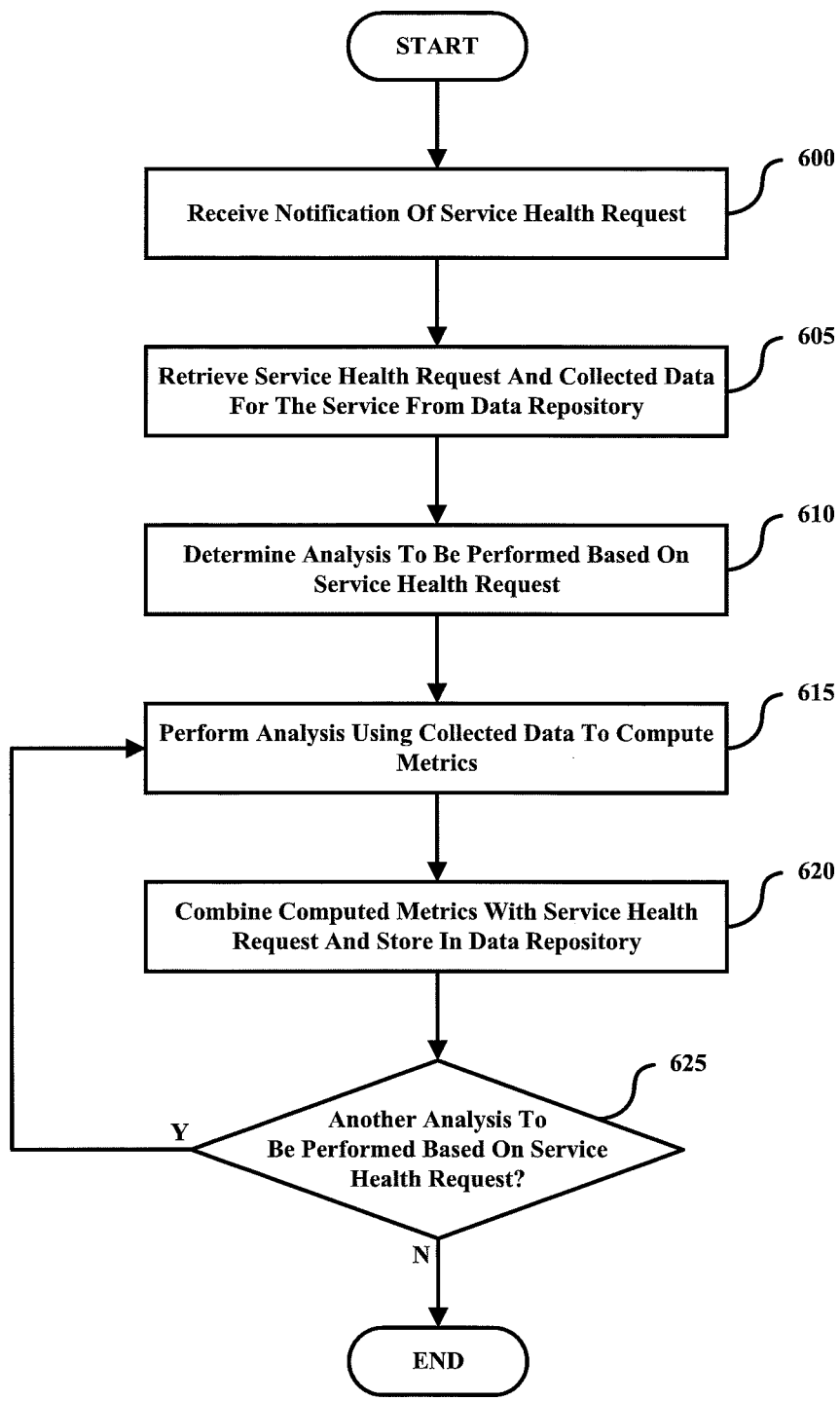
FIG. 6 is a flowchart illustrating an example process for analyzing the health of a service based on data collected from the service according to one or more embodiments described herein.

FIG. 6 illustrates an example process for analyzing the health of a service based on data collected from the service according to one or more embodiments described herein. In at least one example, the process may be performed by an analyzer component of a data repository system configured for service health monitoring (e.g., analyzer 350 of the example system shown in FIG. 3).

The process may begin at block 600 where a notification of a service health request may be received (e.g., by the analyzer 350). For example, the notification received at block 600 may be a notification that data has been collected by one or more data collectors (e.g., one or both of the internal data collector 330 and the external data collector 335) for a particular component or function of a service being monitored (e.g., monitored internal service 380 or monitored external service 385).

At block 605, the service health request and any collected data associated with the request may be retrieved from the data repository (e.g., from the data repository 345). In one embodiment, the service health request and collected data may be retrieved at block 605 in response to receiving the notification at block 600, while in another embodiment, the data repository may be polled at predetermined intervals (e.g., every 10 seconds, every 5 minutes, etc.) to determine whether any new service health requests and/or collected data has been stored in the data repository.

The process may continue at block 610 where, based on the service health request retrieved at block 605, a determination may be made about the analysis to be performed. For example, it may be determined that the analysis to be performed includes searching the payload to identify particular contents. In another example, the analysis to be performed may be extracting metadata about the operation (e.g., the size of the response) for comparison to previous values. In still a further example, it may be determined that the analysis includes a comparison of the response from multiple servers to ensure that they have computed similar results.

At block 615, the analysis determined at block 610 may be performed using the collected data for the monitored service. In at least one embodiment, the analysis may be performed at block 615 in order to compute one or more metrics for evaluating the health of the subject service. Examples of such metrics include payload size, whether or not a particular type of values were found in the payload returned by the server, the latency of various phases of the data collection process (e.g., time to connect, time spent on the server computing a result, etc.), and the quantity and type of differences between what was expected and what was observed.

Following the analysis performed at block 615, the process may move to block 620 where the metrics computed from the analysis may be combined with the service health request and stored in the data repository (e.g., data repository 345). For example, the service health request and corresponding computed metrics may be stored in the data repository 345 by the analyzer 350 for later retrieval and use by the publisher 360, which may be configured to take the results of the analysis and promulgate them in one or more ways, as described above. For example, where the publisher 360 is an interface, the service health request and computed metrics may be provided for presentation to a user in a format suitable for administrative review of service health.

At block 625, a determination may be made about whether a further analysis is to be performed based on the particular service health request. For example, where the service health request is a request for a one-time monitoring event of a component or function of a service, it may be determined at block 625 that no further analysis is necessary and the process completes. On the other hand, where the service health request is a request for continuous monitoring of a component or function of a service, it may be determined at block 625 that one or more additional analyses must be performed such that the process may return to block 615.

Figure 7:
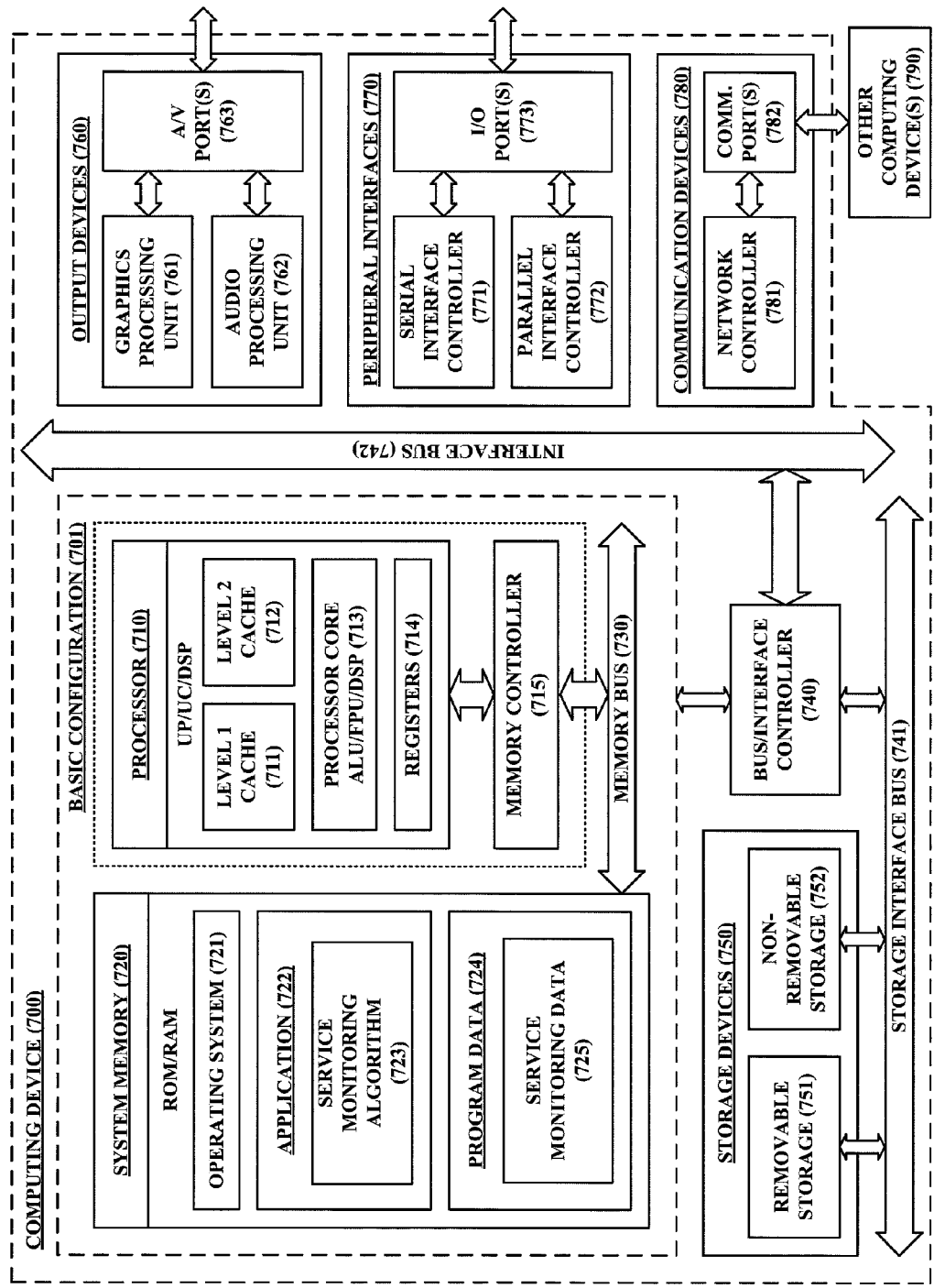
FIG. 7 is a block diagram illustrating an example computing device arranged for processing a service health request according to one or more embodiments described herein.

FIG. 7 is a block diagram illustrating an example computing device 700 that is arranged for producing a comprehensive collection of analytical values describing the health of a service or system, and providing these metrics to a monitoring and alerting system for historical analysis and notification of service administrators in accordance with one or more embodiments of the present disclosure. In a very basic configuration 701, computing device 700 typically includes one or more processors 710 and system memory 720. A memory bus 730 may be used for communicating between the processor 710 and the system memory 720.

Depending on the desired configuration, processor 710 can be of any type including but not limited to a microprocessor (μP), a microcontroller (μC), a digital signal processor (DSP), or any combination thereof. Processor 710 may include one or more levels of caching, such as a level one cache 711 and a level two cache 712, a processor core 713, and registers 714. The processor core 713 may include an arithmetic logic unit (ALU), a floating point unit (FPU), a digital signal processing core (DSP Core), or any combination thereof. A memory controller 715 can also be used with the processor 710, or in some embodiments the memory controller 715 can be an internal part of the processor 710.

Depending on the desired configuration, the system memory 720 can be of any type including but not limited to volatile memory (e.g., RAM), non-volatile memory (e.g., ROM, flash memory, etc.) or any combination thereof. System memory 720 typically includes an operating system 721, one or more applications 722, and program data 724. In at least some embodiments, application 722 includes a service monitoring algorithm 723 that is configured to receive raw data (e.g., payloads) from a plurality of sensors and pass the data to appropriate analyzer units for analysis. The service monitoring algorithm is further arranged to generate metrics as a result of the analyzed data and forward the metrics (e.g., analytical values) to a monitoring system for further historical analysis.

Program Data 724 may include service monitoring data 725 that is useful for routing received payloads to appropriate analyzers and storing generated metrics in associated data repositories. In some embodiments, application 722 can be arranged to operate with program data 724 on an operating system 721 such that a received payload is analyzed one or more times to generate necessary metrics before being stored in one or more data repositories or databases.

Computing device 700 can have additional features and/or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of computing device 700.

Computing device 700 can also include an interface bus 742 for facilitating communication from various interface devices (e.g., output interfaces, peripheral interfaces, communication interfaces, etc.) to the basic configuration 701 via the bus/interface controller 740. Example output devices 760 include a graphics processing unit 761 and an audio processing unit 762, either or both of which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773.

An example communication device 780 includes a network controller 781, which can be arranged to facilitate communications with one or more other computing devices 790 over a network communication (not shown) via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular team herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A monitoring system comprising:
   one or more processing devices; and
   one or more storage devices storing instructions that, when executed by the one or more processing devices, cause the one or more processing devices to perform:
   receiving sensor data obtained for a network service from a plurality of sensors at one or more locations of the network service;
   combining the sensor data for the network service received from the plurality of sensors;
   analyzing the combined sensor data for the network service;
   generating one or more metrics for evaluating performance of the network service, the one or more metrics being based on the analyzed combined sensor data; and
   storing the one or more metrics in a data repository.

2. The system of claim 1, wherein the one or more processing devices are further caused to perform retrieving, from at least one database, historical sensor data for the network service.

3. The system of claim 2, wherein the one or more processing devices are further caused to perform:
   combining the sensor data for the network service received from the plurality of sensors with the historical sensor data for the network service retrieved from the at least one database; and
   analyzing the combined sensor data and historical sensor data to generate one or more metrics for evaluating performance of the network service.

4. The system of claim 1, wherein the one or more processing devices are further caused to perform retrieving, from at least one database, administrative data for the network service, the administrative data indicating an expected status of the network service.

5. The system of claim 4, wherein the one or more processing devices are further caused to perform:
   combining the sensor data for the network service received from the plurality of sensors with the administrative data for the network service retrieved from the at least one database; and
   analyzing the combined sensor data and administrative data to generate one or more metrics for evaluating performance of the network service.

6. The system of claim 1, further comprising an administrative database configured to store data about an operational status of the network service.

7. The system of claim 1, further comprising a health history database configured to store data about historical observations for the network service.

8. The system of claim 1, further comprising an alerting component configured to generate an alert signal based on the one or more metrics for evaluating performance of the network service.

9. The system of claim 8, wherein the one or more processing devices are further caused to perform sending a notification of the one or more metrics being stored in the data repository to the alerting component.

10. The system of claim 1, wherein the sensor data includes processed and/or unprocessed sensor data for the network service.

11. The system of claim 1, wherein the one or more metrics include one or more of operating efficiency of the network service, overloaded components of the network service, and failing components of the network service.

12. A computer-implemented method for monitoring a network service, the method comprising:
   receiving sensor data obtained for the network service from a plurality of sensors at one or more locations of the network service;
   combining the sensor data for the network service received from the plurality of sensors;
   analyzing the combined sensor data for the network service;
   generating one or more metrics for evaluating performance of the network service, the one or more metrics being based on the analyzed combined sensor data; and
   storing the one or more metrics in a data repository.

13. The method of claim 12, further comprising:
   obtaining, from a database, historical sensor data stored for the network service;
   combining the sensor data received from each of the sensors with the historical sensor data obtained from the database; and
   generating one or more metrics for evaluating performance of the network service based on the combined sensor data and historical sensor data.

14. The method of claim 12, further comprising:
   obtaining, from a database, administrative data for the network service, the administrative data indicating an expected status of the network service;
   combining the sensor data received from each of the sensors with the administrative data obtained from the database; and
   generating one or more metrics for evaluating performance of the network service based on the combined sensor data and administrative data.

15. The method of claim 12, further comprising:
   obtaining, from one or more databases, historical sensor data and administrative data stored for the network service, the historical sensor data including historical observations for the network service and the administrative data indicating an expected status of the network service;
   generating one or more metrics for evaluating performance of the network service based on the sensor data received from the sensors, the historical sensor data, and the administrative data; and
   storing the computed one or more metrics, the sensor data, the historical sensor data, and the administrative data in a data repository.

16. The method of claim 12, further comprising generating a notification that the one or more metrics are stored in the data repository.

17. A computer-implemented method comprising:
   receiving, at a server, a service health request for a network service;
   determining that the service health request is valid based on the service health request being consistent with the network service and resources being available to fulfill the request;

collecting sensor data for the network service;

storing the service health request and the collected sensor data in a data repository; and generating a notification indicating that the service health request and the collected sensor data for the network service are stored in the data repository.

18. The method of claim 17, wherein the service health request is a request for the network service to be monitored.

19. The method of claim 17, wherein the service health request is a request to verify a connection with the network service.

20. The method of claim 17, further comprising:

determining that the request is consistent with the network service; and determining that resources are available to fulfill the request.

21. The method of claim 17, wherein collecting sensor data for the network service includes:

sending a data collection request to sensors at one or more locations of the network service; and receiving, in response to the data collection request, sensor data from each of the sensors.

22. The method of claim 17, further comprising:

obtaining, from one or more databases, data about historical observations made for the network service and data about expected status of the network service; and storing the data about historical observations and the data about expected status in the data repository with the service health request and collected sensor data.

23. A computer-implemented method comprising:

receiving, at a server, a notification that a service health request has been made for a network service;

retrieving, from a data repository, the service health request and data collected for the network service;

determining, based on the service health request, one or more analyses to be performed;

performing the one or more analyses using the data collected for the network service to compute one or more metrics for evaluating performance of the network service; and storing the one or more computed metrics with the service health request in the data repository.

24. The method of claim 23, wherein the data collected for the network service includes one or more of sensor data obtained by sensors at one or more locations of the network service, data about historical observations made for the network service, and administrative data for the network service, the administrative data indicating an expected status of the network service.

25. The method of claim 23, further comprising generating a notification indicating that the service health request and the one or more computed metrics for the network service are stored in the data repository.

* * * * *